H. DRAGON.
PIE EDGE TRIMMER.
APPLICATION FILED AUG. 5, 1919.
1,329,586.
Patented Feb. 3, 1920.
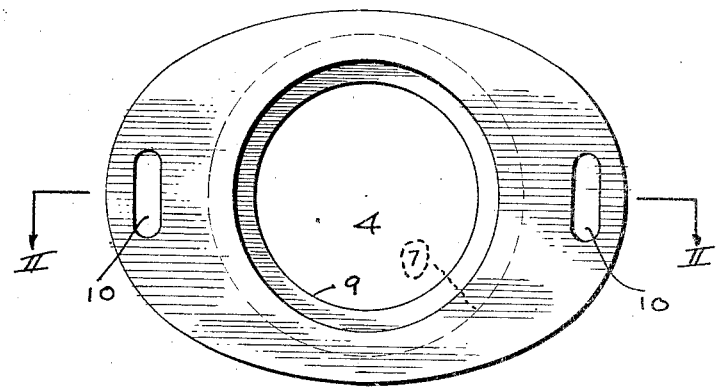
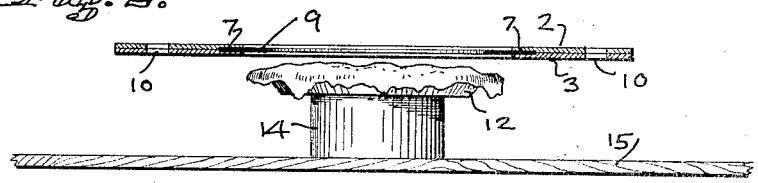
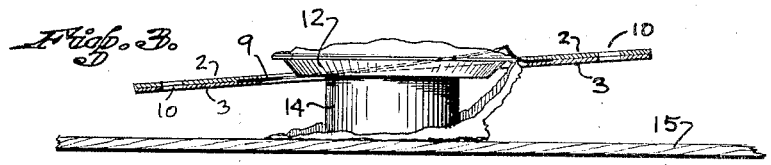
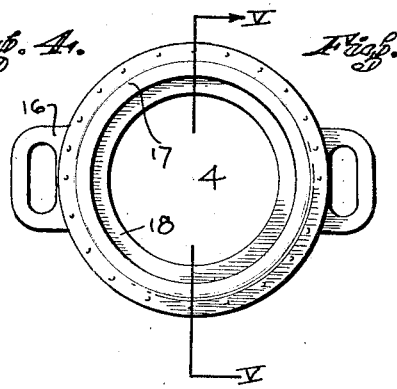
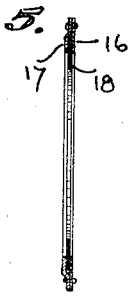
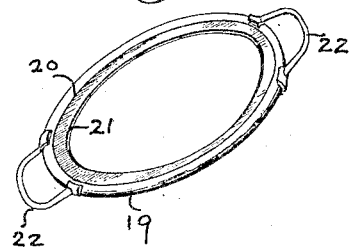
INVENTOR
HIPPOLYTE DRAGON
BY
ATTORNEY

UNITED STATES PATENT OFFICE.

HIPPOLYTE DRAGON, OF SAN FRANCISCO, CALIFORNIA.

PIE-EDGE TRIMMER.

1,329,586.   Specification of Letters Patent.   Patented Feb. 3, 1920.

Application filed August 5, 1919. Serial No. 315,538.

*To all whom it may concern:*

Be it known that I, HIPPOLYTE DRAGON, a citizen of the United States, and a resident of the city and county of San Francisco, State of California, have made a new and useful invention—to wit, Pie-Edge Trimmers; and I do hereby declare the following to be a full, clear, concise, and exact description of the same.

This invention relates particularly to a device for trimming away the uneven and unnecessary dough which accumulates on the edge of a baking pan or more particularly that of a pie tin, after the lower crust, filler and upper crust have been placed in the pan preparatory to baking.

The object of my invention is to provide an apparatus that will enable a baker or operator to make a pie in about one half the time that it now takes, also making unnecessary any particular skill upon the part of the baker or operator in finishing the pie edge.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the one sheet of drawing,

Figure 1 represents a plan view of my improvement.

Fig. 2 is a sectional view of Fig. 1 taken on line 11—11.

Fig. 3 illustrates the trimmer partially in operative position.

Fig. 4 is a plan view modified form of trimmer.

Fig. 5 is a sectional view taken on the line V—V of Fig. 4.

Fig. 6 is a perspective view of a modified form of trimmer.

In detail the construction illustrated in the drawing consists of a flat, oval shaped member formed (in Figs. 1 and 2) of two separate pieces of material, 2 and 3, joined together in any suitable manner and having the central portion thereof cut away in a circular manner as at 4. In this application, I have shown and described the central cut away portion as being circular but it is to be understood that said hole might be any one of a number of different shapes and still be within the scope of my invention. The inside diameter of the hole 4 is large enough to easily and freely clear the outside diameter of any circular container used for baking pies.

Each of the pieces 2 and 3 on one face thereof, previous to assembly, are turned down as at 7, adjacent the edge of the hole 4 to form a seating for the circular rubber gasket 9. The gasket is preferably formed of rubber because of its resiliency and adaptability for use in this particular instance, although it is to be understood that the substitution of some other equivalent medium is within the purview of this invention. The outside diameter of the gasket 9 is preferably made large to completely fill the seating 7 while the inside diameter of said gasket is smaller than the outside diameter of a circular container and the inside diameter of the hole 4, partially restricting that opening.

The improvement shown in Fig. 1 is assembled by first placing the gasket 9 in its seating 7 in either section, 2 or 3, of the member 1 and then placing the remaining section thereon and securing both of said members together so as to hold the gasket 9 firmly in place. To facilitate handling of my device, I provide the holes 10—10 which are adapted to receive the hands of an operator.

In Figs. 2 and 3, I illustrate the manner in which my device operates. The unfinished pie with untrimmed edges in the container 12 is shown resting upon the pedestal 14 preferably located upon the baker's work table 15. The trimmer 1 is then brought over the pie container 12 so that the hole 4 is in axial alinement therewith, and then brought down so that the gasket 9 is compressed against the edge of the container 12 thereby forcing the gasket upward and the overhanging piece of dough outward and downward shearing it off flush with the edge of the container.

It can be seen that by properly proportioning the gasket 9 with regard to its extension over the edge of the pie container, both upper and lower crusts can be joined together before the edge is trimmed so as to keep the filler content within the crusts, which feature is essential for a marketable product.

Figs. 4 and 5 illustrate a modified form of trimmer made out of thin, light metal consisting of the handle member 16, clamping member 17, with the hole 4 formed therein and gasket 18 both of said members in this instance being assembled similarly to Fig. 1 and joined together by rivets or other suitable medium.

Fig. 6 represents still another modified form of trimmer consisting of a circular piece of pipe 19 having the internal peripheral slot 20 adapted to receive the gasket 21 and having the handles 22—22 thereon. The gasket is held in place by pressing together the edges of the slot 20.

What I claim and desire to secure by Letters Patent is:—

1. A pie edge trimmer having an orifice therein and resilient means on the periphery of said orifice adapted to engage the edge of a container.

2. A pie edge trimmer having a circular hole therein; a resilient gasket on the periphery of said hole, of smaller diameter than said first mentioned hole, adapted to engage the edge of a container which is passed through.

3. A pie edge trimmer having a circular hole therein, a rubber gasket clamped on the periphery of said hole, partially restricting said opening, adapted to engage the edge of a container which is passed through.

4. A pie edge trimmer having an orifice therein and rubber means adjacent the edge of and partially restricting said orifice and adapted to engage the edge of a container which is passed through.

In testimony whereof, I have hereunto set my hand at San Francisco, California, this 31st day of July, 1919.

HIPPOLYTE DRAGON.

In presence of—
CHALMER MUNDAY.